Jan. 22, 1957  H. BERGER  2,778,948
ELECTRO-THERAPEUTIC APPARATUS
Filed July 7, 1952
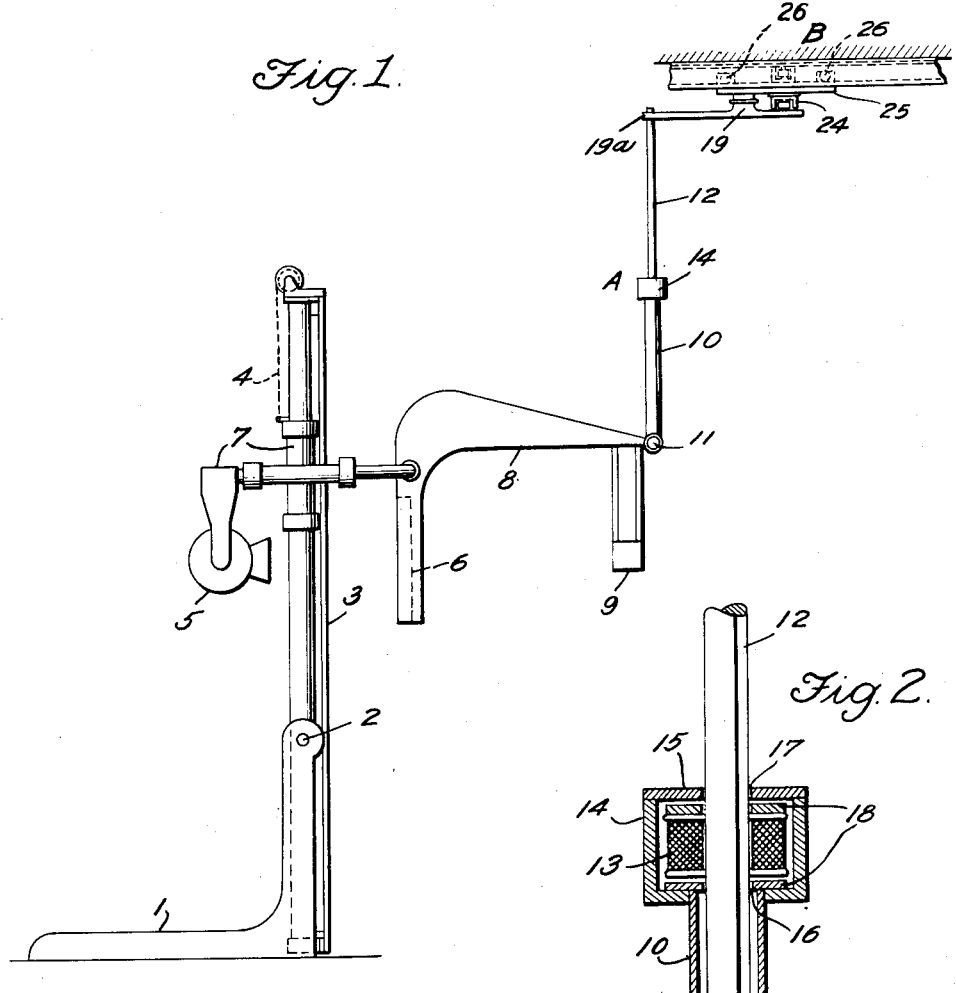
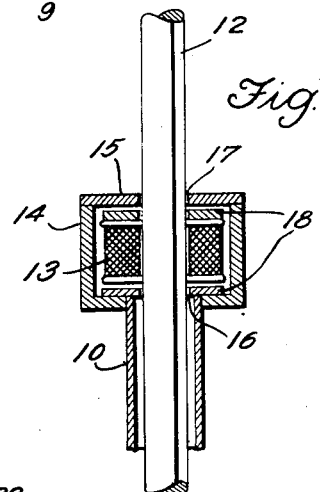
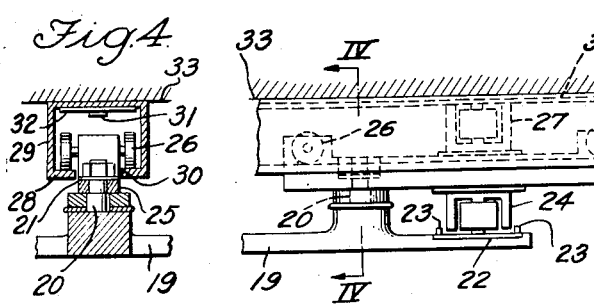
INVENTOR
HELMUTH BERGER
BY
ATTORNEYS United States Patent Office 2,778,948
Patented Jan. 22, 1957

2,778,948
ELECTRO-THERAPEUTIC APPARATUS
Helmuth Berger, Erlangen, Germany
Application July 7, 1952, Serial No. 297,531
8 Claims. (Cl. 250—79)

This invention relates to an electro-therapeutical apparatus and refers, more particularly, to an apparatus for X-ray investigation.

Practical experience has shown that an apparatus of this type usually has projecting arms carried by a column and carrying various parts of the apparatus, such as the X-ray tube, the luminous screen, the device for photographing the images on the luminous screen, a device for sharpening the image and many others. As a result of these elongated arms, a strong turning movement is exerted upon the apparatus which produces oscillations, affecting most detrimentally such sensitive devices as the photographing apparatus or the like.

An object of the present invention is to eliminate drawbacks of this nature.

Another object is to provide an electro-therapeutical apparatus which is stable and secure in construction and which is not subject to oscillations.

Other objects of the present invention will become apparent in the course of the following specification.

In accomplishing the objects of the present invention, it was found desirable to combine the electro-therapeutical apparatus with a supporting device, consisting of at least two rigid supporting elements which are immovable relatively to each other, the supporting device being connected to the apparatus and to a part of the room or structure enclosing the apparatus, preferably the roof.

In accordance with a preferred modification of the inventive idea, the supporting device consists of two supporting elements, one of which has an end connected with an element of the apparatus or with the auxiliary support thereof, while the other supporting element has one end connected with the structural element. The two ends of the supporting elements are connected with each other by means of at least one link.

According to another modification of the inventive idea, the two supporting or connecting elements telescope in relation to each other. One end of one of the supporting or connecting elements is again connected with a part of the apparatus or with the auxiliary support thereof, while the other supporting or connecting element has an end connected with the structural element, preferably by means of a link.

It is preferred, however, to combine these two modifications into a single construction in such manner that of the two connecting elements at least one has telescoping parts, the two connecting elements being joined by a link.

It is advisable to provide suitable locking devices for locking the two connecting elements in their respective relative positions. According to a preferred embodiment of the inventive idea, electro-magnetic locking means are provided for the locking of the connecting elements, one of the connecting elements carrying the magnetic spool and the other locking element carrying the movable core of the electro-magnet. An advantage of such electro-magnetic locking means is that when several locking devices are used, it is comparatively simple to operate these devices from switches which may be arranged on the supporting column. Finally, in accordance with the present invention, the point of support of the supporting device upon the structural element can be adjusted and shifted. By way of example, the end of the supporting device directed toward the guiding part can be mounted upon a carriage or a slide which may be shifted along rails attached, by way of example, upon the roof of the room wherein the apparatus is located. The carriage or slide may be located in any position by a suitable locking device, consisting preferably of the above described electro-magnetic means. The supporting element can be either directly connected with the carriage or slide or it can be mounted upon an arm which is mounted upon the carriage and is swingable about a vertical axis. The length of this swingable arm can be also adjusted in the same manner in which the above-mentioned connecting elements can be adjusted.

The invention will appear more clearly from the following detailed description when taken in connection with the accompanying drawings, showing by way of example a preferred embodiment of the inventive idea.

In the drawing:

Figure 1 shows in side elevation an X-ray apparatus constructed in accordance with the principles of the present invention;

Figure 2 is an enlarged sectional view of the locking device A shown in Figure 1;

Figure 3 is an enlarged side view of the portion of the device indicated by the letter B in the drawing;

Figure 4 is a section along the line IV—IV of Figure 3.

The X-ray apparatus shown in the drawings includes essentially a base 1 carrying a pivot 2 which swingably supports a carrier carrying a patient's bed or a patient's support 3. An endless chain 4, which may be replaced by any other suitable element, is connected with a sleeve carrying an X-ray tube 5. It is apparent that the X-ray tube 5 is suspended upon the apparatus and that it is movable longitudinally, transversely, and perpendicularly to the supporting surface. A device 7 contains other auxiliary devices, such as the carriage for the X-ray tube and the carriage for the luminous screen. An arm connects the X-ray tube 5 with the luminous screen 6 which is connected to a projecting carrier 8 supporting the photographic apparatus 9. The X-ray tube carriage, the luminous screen carriage, and the patient's bed are made adjustable and can be locked in various positions by means of mechanical or electro-magnetic locking devices which are not shown in the drawings.

It is apparent that this apparatus has projecting parts upon which a strong torque is exerted and which are subject to concussions or oscillations.

In accordance with the present invention the carrier 8 is supported in relation to the ceiling 33 of the room containing the apparatus, by means of a device which will be described in detail hereinafter and which is designated by the numerals 10 to 27. This device is adjustable and can be locked in a number of selected positions.

This supporting device includes a rigid portion containing telescopic elements illustrated in greater detail in Figure 2 and designated by the numerals 10 to 18.

A tube 10 is pivotally connected at 11 with the support 8 to provide a positive connection therebetween and contains a rod 12 which is movable relatively to the tube 10 so that a telescopic arrangement is provided.

A locking device A is used to lock the telescopic elements 10 and 12 in a selected position. The locking device A is an electro-magnetic one and includes an electro-magnet 13 as well as a casing consisting of two portions 14 and 15 and provided with openings 16 and 17 for the rod 12. The locking is carried out by clamps 18 which are movable in and out and which are pressed by the magnetic field created by the electro-magnet 13 against rod 12, to lock it in predetermined position.

The upper end of the rod 12 is connected with a link system comprising a pivot 19a connected with an arm 19 which is mounted upon a pivot 20 carried by a support 21 attached to the carriage 25. It is apparent that the arm 19 is swingable in a horizontal plane.

An electro-magnetic locking device 24 is used to lock the arm 19 in a predetermined position and is provided with an electro-magnet attached to the under-surface of the carriage 25. A rail 22 is influenced by the magnetic field of the magnet to lock the arm 19. The rail 22 is shiftable along the guides 23 and may be locked in any desired position.

The carriage 25 is provided with wheels 26 which run upon rails 28 attached to brackets 29 which are fixed to the ceiling 33. The rails 28 are located at a distance from each other to provide a space 30 within which the carriage 25 is moved.

The carriage 25 may be locked by means of an electro-magnetic locking device 27 which includes an electro-magnet mounted upon the carriage 25. A rail 32 is locked by the magnetic field of the magnet and is movably mounted upon an inner surface of the upper side of the brackets 29. It is apparent that the locking device 27 is usable to stop the carriage 25 in any selected position relatively to the electro-magnet 29.

It is further apparent that the above illustration has been given solely by way of illustration and not by way of limitation and that it is subject to many variations and modifications within the scope of the present invention. All such variations and modifications are to be included within the scope of the present invention.

What is claimed is:

1. In an electro-therapeutical apparatus having a source of rays and a screen, in combination with a fixed structural element, a vertical column, a horizontal arm carried by said column and carrying said source and screen, at least two rigid connecting elements, one of said connecting elements having an end adjustably and rigidly connected to said structural element, the other one of said rigid connecting elements extending towards said structural element from said arm and having an end positively connected to said arm, and means adjustably and rigidly interconnecting the other two ends of said connecting elements.

2. An apparatus in accordance with claim 1 wherein the last-mentioned means consist of electro-magnetic locking means.

3. An apparatus in accordance with claim 2 wherein the electro-magnetic locking means include a magnetic winding carried by one of said rigid connecting elements and a magnetic core carried by the other one of said rigid connecting elements.

4. An apparatus in accordance with claim 1, wherein the positive connection of an end of the other one of said rigid connecting elements to said arm consists of a pivot.

5. An apparatus in accordance with claim 1, wherein the two rigid connecting members are telescoping.

6. An apparatus in accordance with claim 1, wherein the adjustable and rigid connection of an end of said one rigid connecting element to said structural element includes a link system.

7. An apparatus in accordance with claim 1, wherein the adjustable and rigid connection of an end of said one rigid connecting element to said structural element includes a support adjustably mounted upon said structural element and means rigidly connecting said support with that end of said one rigid structural element.

8. An apparatus in accordance with claim 1, wherein the adjustable and rigid connection of an end of said one rigid connecting element to said structural element includes rails mounted upon said structural element, a carriage mounted on said rails, means rigidly connecting said carriage with that end of said one rigid structural element and an electro-magnetic locking device for locking said carriage upon said rails.

References Cited in the file of this patent

UNITED STATES PATENTS

| | | |
|---|---|---|
| 961,607 | Granger | June 14, 1910 |
| 1,881,087 | Martin | Oct. 4, 1932 |
| 1,926,902 | Kelley | Sept. 12, 1933 |
| 2,156,170 | Augustin et al. | Apr. 25, 1939 |
| 2,441,538 | Steinhaus | May 11, 1948 |
| 2,659,827 | Scag et al. | Nov. 17, 1953 |

FOREIGN PATENTS

| | | |
|---|---|---|
| 271,388 | Germany | Mar. 10, 1914 |
| 297,022 | Italy | June 1, 1932 |